| United States Patent [19] | [11] | 4,264,485 |
|---|---|---|
| Ohm | [45] | Apr. 28, 1981 |

[54] INSULATING COATING COMPOSITION FOR WIRE

[75] Inventor: Klaus Ohm, Nettetal-Lobberich, Fed. Rep. of Germany

[73] Assignee: Chemische Fabrik Dr. Wiedeking, Kempen, Fed. Rep. of Germany

[21] Appl. No.: 953,342

[22] Filed: Oct. 23, 1978

[30] Foreign Application Priority Data

Oct. 22, 1977 [DE] Fed. Rep. of Germany ....... 2247456

[51] Int. Cl.$^3$ ................................................ C08K 5/12
[52] U.S. Cl. .............................................. 260/31.8 N
[58] Field of Search ...................... 260/31.8 R, 31.8 N, 260/31.8 H, 31.8 G, 32.6 NT, 32.6 NR

[56] References Cited

U.S. PATENT DOCUMENTS

| 3,401,137 | 9/1968 | Finelli | 260/31.8 N |
|---|---|---|---|
| 3,440,224 | 4/1969 | Impola | 260/31.8 N |
| 3,620,996 | 11/1971 | Matsumura | 260/32.6 NT |
| 3,661,862 | 5/1972 | Bonin | 260/31.8 N |

OTHER PUBLICATIONS

D. N. Buttrey, "Plasticizers", Franklin Pub. Co., Palisade, New Jersey, 1960, pp. 5-6.

*Primary Examiner*—Paul R. Michl
*Attorney, Agent, or Firm*—Toren, McGeady and Stanger

[57] ABSTRACT

An insulating coating composition which is liquid or solid at normal temperature consists essentially of a normally liquid organic medium and a resin composition which is either a polyesterimide or a precursor of a polyester urethane and is soluble in the medium at 150° C. The medium consists of 10% to 100% dimethyl phthalate, 90% to 0% conventional solvent for the resin composition, and 0% to 40% diluent.

7 Claims, No Drawings

INSULATING COATING COMPOSITION FOR WIRE

This invention relates to insulating coating compositions for electrically conductive wires, and particularly to coating compositions which consist essentially of a normally liquid medium and at least one resin composition which is a polyesterimide or a precursor of a polyester urethane.

Insulating wire coatings recently developed consist predominantly of polyesterimides, that is, the products of a condensation reaction between terephthalic, isophthalic, trimellithic, or pyromellithic acid with one or more polyhydric alcohols and aromatic diamines, or polyester urethanes which are the reaction products of polyesters of isophthalic and/or terephthalic acid having reactive hydroxyl groups with stabilized polyisocyanates. They have found industrial application on a large scale and are deposited on the wires to be insulated either from normally liquid compositions or from compositions which are solid at ordinary temperature (20° C.) and melt at elevated temperatures, to solidify again when cooled. The coatings are distinguished by great mechanical strength and excellent thermal stability, that is, a high thermal endurance limit, as determined, for example, by German Industrial Standard DIN 46453/S.2.

The polyesterimides and polyester urethanes were originally known to be soluble only in solvents which are phenols, such as phenol, cresol, and xylenol, or contain nitrogen, such as dimethylformamide, dimethylacetamide, N-methylpyrrolidone and the like. These solvents are objectionable from an environmental point of view and toxic to humans. Less objectionable solvents were disclosed in my U.S. Pat. No. 4,104,235, but are applicable only to specific types of polyester urethane coatings.

It is a primary object of this invention to provide lacquer coating compositions for insulating conductors with layers of polyesterimides and polyester urethanes which employ a solvent medium generally applicable to all the resins of the types outlined above and having the desirable environmental properties of the solvents disclosed in my earlier patent.

It is another object to provide coating compositions which are suitable for curing at higher temperatures than were available heretofore and thus permit higher operating speeds of continuous coating equipment, yet avoid the defective coatings that were obtained with known compositions when it was attempted to cure them at relatively high temperatures.

It has been found that dimethyl phthalate imparts desirable characteristics to coating compositions otherwise consisting of known components.

More specifically, a coating composition of the invention, which may be liquid or solid at 20° C., consists essentially of an organic medium which is a homogeneous liquid when at 20° C., and of at least one resin composition selected from the group consisting of a polyesterimide and the reactive constituents of a polyester urethane, the resin composition being soluble in the medium at a temperature of not more than 150° C.

The medium consists of at least 10% dimethyl phthalate (hereinafter DMP), but may consist entirely of DMP. If not, the medium may further include up to 90% of an organic solvent and up to 40% of a diluent, the resin composition being soluble in the DMP and in the solvent, and the solubility of the polyesterimide and of the polyester urethane in the diluent at 150° C. being not more than 10% of their solubility in DMP. As indicated above, the medium of the invention is generally applicable to polyesterimides which are condensation products of one or more acids of the group consisting of terephthalic, isophthalic, trimellithic, and pyromellithic acid, with one or more polyhydric alcohols, and one or more aromatic diamines. The medium is equally applicable to polyurethane precursors, that is, the reactive constituents for a polyurethane which are polyesters of isophthalic or terephthalic acid having available hydroxyl groups and one or more stabilized polyisocyanates, that is, compounds having at least two isocyanato groups.

The polyesterimides, to be useful in wire coatings contemplated according to this invention, should have a thermal endurance limit of at least 170° C., and the polyester urethanes an endurance limit of 120° C., as determined according to the afore-mentioned German Industrial Standard. Depending on the intended mode of application, the resin composition may amount to 20°% to 95% of the weight of the coating composition.

The coating compositions, after being applied in the liquid state to wires on conventional, continuously operating equipment, are baked to volatilize the medium and to react the constituents of the polyurethane. The baking oven temperature determines the volatilization rate and/or reaction rate, and is usually the factor limiting the rate at which wire may be processed. The nature of the medium is the primary factor controlling the permissible baking oven temperature. Conventional media, even those of the afore-mentioned earlier patent, produce blistered and otherwise defective coatings if specific baking temperature limits are exceeded. DMP in the medium volatilizes only at higher temperatures than the solvents and diluents employed heretofore and permits the baking oven temperature to be raised by approximately 100° C. under otherwise comparable conditions because of its superior spreading characteristics at the higher temperatures. There is no need for a phenol or a nitrogen-bearing compound in the solvent. In this manner, substantially more solvent is evaporated in the oven per unit of time. It is a concomitant feature in ovens with catalytic combustion and heat recovery that more heat of combustion is available thereby per unit of time so that the requirement for outside energy for heating the oven can be held at a lower level.

The normally liquid coating compositions of the invention may be formulated and applied in a known manner to permit soldering of the wires without stripping the insulation, and the normally solid compositions applied by melt-coating may consist entirely of resin or resin precursor and DMP. The latter does not evaporate from the melt at the coating temperature, but substantially lowers the viscosity of the same, again contributing to higher operating speeds.

Liquid coating compositions preferably contain a medium including 40% to 80% dimethyl phthalate, the remainder consisting of conventional solvents and/or such diluents as aliphatic hydrocarbons, xylene or butanol. The resin composition may amount to 20% to 60% of total coating composition weight, a range of 30% to 55% being usually best.

The conventional solvent component in the medium may include or consist entirely of the solvents of my earlier patent, if applicable, that is, diacetone alcohol, monoalkyl ethers of the formula $C_nH_{2n+1}$—(O—$CH_2CH_2$)$_m$—OH and/or the esters of these ethers with aliphatic monocarboxylic acids having a carbon chain of not more than four atoms, n in the formula being an integer between 1 and 4, and m being 1 or 2.

The conventional solvents preferably employed in normally liquid coating compositions of the invention reduce the viscosity and thereby improve processing characteristics, and the diluents mainly reduce the cost.

The improvements due to the presence of DMP in the medium are of particular value with polyesterimide resins in which the polyhydric alcohol moiety is or includes tris-(hydroxyethyl)-isocyanurate in an amount of 5% to 40% based on the total weight of the resin composition.

In the normally solid coating compositions, DMP may amount to 5% to 30% of the weight, the remainder being resin composition, and it is preferred that DMP amount to 10% to 20% of the weight of the coating composition.

Resin compositions predominantly consisting of polyesterimides are superior in many applications to those consisting predominantly of polyurethane precursor, that is, the reactive constituents which are polyesters of isophthalic or terephthalic acid having available hydroxyl groups and stabilized polyisocyanate. However, the medium of the invention is suitable for both classes of coating compositions.

The following Examples are further illustrative of this invention. All amounts enumerated are in parts by weight unless specifically stated otherwise.

EXAMPLE 1

500 parts ethyleneglycol, 5 parts zinc acetate, 1000 parts tris-(hydroxyethyl)-isocyanurate (hereinafter THEIC), 650 parts dimethyl terephthalate, 1550 parts trimellithic anhydride, and 770 parts diamino-diphenylmethane were mixed and held at approximately 240° C. in a conventional manner until a polyesterimide resin was formed. 100 Parts of the resin were dissolved in 200 parts DMP, and 2 parts acetyl-acetone titanate was added. The lacquer so produced was used on conventional equipment by felt or die application to copper and aluminum wire and baking to produce insulated wires at a high rate.

EXAMPLE 2

A similar lacquer was prepared from the polyesterimide resin obtained by condensation of 1200 parts ethyleneglycol, 6 parts zinc acetate, 1000 parts THEIC, 650 parts dimethyl terephthalate, 1550 parts trimellithic anhydride, 800 parts diamino-diphenylmethane, and a liquid medium containing, per 100 parts resin, 100 parts DMP, 30 parts solvent naphtha, and 20 parts butanol, also 2 parts acetylacetone titanate.

EXAMPLE 3

While the lacquers of Examples 1 and 2 contained DMP as the only solvent, the following lacquers contained solvents of my earlier patent.

A polyesterimide resin was prepared in the manner of Example 1 from 600 parts ethyleneglycol, 5 parts zinc acetate, 1000 parts THEIC, 750 parts dimethyl terephthalate, 1550 parts trimellithic anhydride, 800 parts diamino-diphenylmethane, and 600 parts diethyleneglycol. 100 Parts resin was dissolved in 100 parts DMP, 20 parts solvent naphtha, and 50 parts methyl diethyleneglycol ether, and 3 parts acetylacetone titanate was added.

EXAMPLE 4

In a manner similar to Example 3, 100 parts resin prepared according to Example 2 was dissolved in 60 parts DMP, 40 parts methyl diethyleneglycol either, and 30 parts methylglycol acetate, with 2 parts acetylacetone titanate.

EXAMPLE 5

A polyesterimide resin was condensed from 250 parts ethyleneglycol, 2 parts zinc acetate, 260 parts THEIC, 760 parts trimellithic anhydride, 340 parts diaminodiphenylmethane, and 250 parts diethyleneglycol. It was dispersed, together with 2 parts acetylacetone titanate, in a mixture of 120 parts DMP, and 10 parts each of solvent naphtha, butanol, and methyl diethyleneglycol ether per 100 parts resin.

EXAMPLE 6

Another polyesterimide resin was prepared from 200 parts ethyleneglycol, 2 parts zinc acetate, 370 parts dimethyl terephthalate, 760 parts trimellithic anhydride, 340 parts diaminodiphenylmethane, and 500 parts diethyleneglycol. 100 Parts of the resin were dissolved in 150 parts DMP and 50 parts methyl diethyleneglycol ether, and 2 parts acetylacetone titanate was added.

The lacquers of Examples 2 to 6 were used successfully in the same manner as that of Example 1.

EXAMPLE 7

Another, normally liquid coating composition suitable for die stripping application was prepared from 100 parts resin, prepared as in Example 2, 100 parts DMP, and 2 parts acetylacetone titanate.

When the amount of DMP in the otherwise unchanged composition was reduced to 20 parts, the composition was normally solid, and was suitable for melt lacquering.

EXAMPLE 8

640 Parts ethyleneglycol, 1 part zinc acetate, 2550 parts dimethyl terephthalate, and 780 parts glycerol were held at approximately 240° C. to produce a polyhydric alcohol component for a polyurethane. A stabilized polyisocyanate solution was prepared separately at up to 140° C. from 956 parts DMP, 552 parts toluylene diisocyanate, 134 parts trimethylolpropane, and 300 parts phenol. The two liquids were mixed in a weight ratio of 100:400 parts with 400 parts DMP to produce a lacquer which was applied to wires and yielded a polyester urethane coating after baking. The coated wires could be soldered without stripping the insulating coating.

A similar lacquer was produced when the two initially prepared liquids were mixed in the same ratio with 200 parts DMP, and 100 parts each of solvent naphtha, butanol, and methyl diethyleneglycol ether.

EXAMPLE 9

1006 Parts DMP, 522 parts toluylene diisocyanate, 134 parts trimethylolpropane, and 350 parts ε-caprolactame were reacted at about 140° C. to a solution of stabilized triisocyanate. 400 Parts of the solution were mixed with 100 parts of the polyhydric alcohol component of Example 8 and 100 parts methyl diethyleneglycol ether to produce yet another lacquer of the invention which could be converted to a solderable coating by baking.

A lacquer having somewhat different processing characteristics, but producing practically the same coating, was obtained when the mixture of 400 parts isocyanate solution and 100 parts polyhydric alcohol described in the preceding paragraph was diluted with 100 parts solvent naphtha, 100 parts butanol, and 200 parts DMP.

It should be understood, of course, that the foregoing disclosure relates only to presently preferred embodiments of the invention, and that it is intended to cover all changes and modifications of the examples herein chosen for the purpose of the disclosure which do not constitute departures from the spirit and scope of the invention set forth in the appended claims.

What is claimed is:

1. A wire coating composition suitable for baking onto a wire at temperatures higher than the volatilization point of dimethyl phthalate consisting essentially of an organic medium, said medium being a homogeneous liquid when at 20° C., and at least one resin composition selected from the group consisting of polyesterimides, said at least one resin composition being soluble in said medium at a temperature of not more than 150° C.,
   (a) said medium consisting of at least 10% dimethyl phthalate, up to 90% of an organic solvent selected from the group consisting of diacetone alcohol, monoalkyl ethers of the formula $C_nH_{2n+1}$—$(O$—$CH_2CH_2)_m$+$OH$ and the esters of these ethers with aliphatic monocarboxylic acids having a carbon chain of not more than four atoms, n in the formula being an integer between 1 and 4 and m being 1 or 2, and up to 40% of a diluent selected from the group consisting of aliphatic hydrocarbons, xylene and butanol,
   (b) said solvent and said diluent having boiling points lower than the boiling point of said dimethyl phthalate,
   (c) said at least one resin composition being soluble in said solvent and in said dimethyl phthalate at said temperature, and the solubility of said polyesterimide in said diluent being less than 10% of the solubility thereof in said dimethyl phthalate,
   (d) said polyesterimide being a condensation product of at least one acid selected from the group consisting of terephthalic, isophthalic, trimellithic, and pyromellithic acid, with at least one polyhydric alcohol, and at least one aromatic diamine,
   (e) said reactive constituents consisting essentially of at least one polyester of isophthalic or terephthalic acid having available hydroxyl groups and at least one stabilized polyisocyanate,
   (f) said polyesterimide having a thermal endurance limit of at least 170° C., said polyester urethane having a thermal endurance limit of at least 120° C.,
   (g) said at least one resin composition being present in said coating composition in an amount of 20 to 95 percent, all percentage values being by weight.

2. A coating composition as set forth in claim 1, wherein 40% to 80% of the weight of said composition consists of dimethyl phthalate, and said at least one resin composition amounts to 20% to 60% of the weight of said composition.

3. A coating composition as set forth in claim 2, wherein said at least one resin composition amounts to 30% to 55% of the weight of said composition.

4. A coating composition as set forth in claim 1 consisting essentially of said dimethyl phthalate and said at least one resin composition, said dimethyl phthalate amounting to 5% to 30% of the weight of said coating composition.

5. A coating composition as set forth in claim 4, wherein said dimethyl phthalate amounts to 10% to 20% of the weight of said coating composition.

6. A coating composition as set forth in claim 1, wherein said at least one resin composition predominantly consists of said polyesterimide, said at least one polyhydric alcohol including tris-(hydroxyethyl)-isocyanurate in an amount of 5% to 40% of the weight of said at least one resin composition.

7. A coating composition according to claim 1, wherein said at least one resin composition predominantly consists of said reactive constituents.

* * * * *